(12) United States Patent
Chan et al.

(10) Patent No.: US 6,748,538 B1
(45) Date of Patent: Jun. 8, 2004

(54) INTEGRITY SCANNER

(75) Inventors: Keen W. Chan, Beaverton, OR (US);
Nai-Chi M. Chu, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/433,837

(22) Filed: Nov. 3, 1999

(51) Int. Cl.[7] .............................. H04L 9/00; H04N 7/167
(52) U.S. Cl. ...................... 713/200; 713/176; 713/181; 380/202
(58) Field of Search ................................ 713/200, 176, 713/181

(56) References Cited

U.S. PATENT DOCUMENTS

| | | | | |
|---|---|---|---|---|
| 5,692,047 A | * | 11/1997 | McMamis ..................... | 713/167 |
| 5,850,449 A | * | 12/1998 | McMamis ..................... | 713/161 |
| 6,044,466 A | * | 3/2000 | Anand et al. ................ | 713/200 |
| 6,119,229 A | * | 9/2000 | Martinez et al. ............. | 713/200 |
| 6,157,721 A | * | 12/2000 | Shear et al. ................. | 380/255 |
| 6,330,677 B1 | * | 12/2001 | Madoukh ..................... | 713/200 |
| 6,367,012 B1 | * | 4/2002 | Atkinson et al. ............. | 713/176 |
| 6,510,513 B1 | * | 1/2003 | Danieli ....................... | 713/156 |
| 6,546,487 B1 | * | 4/2003 | McManis ..................... | 713/169 |
| 6,591,250 B1 | * | 7/2003 | Johnson et al. ............... | 705/51 |
| 6,594,763 B1 | * | 7/2003 | Madoukh ..................... | 713/200 |

* cited by examiner

Primary Examiner—Thomas R. Peeso
Assistant Examiner—Kambiz Zand
(74) Attorney, Agent, or Firm—Rob D. Anderson

(57) ABSTRACT

A platform featuring memory which contains a plurality of software components and a manifest which includes a digest of each of the plurality of the software components and a processor which is coupled to the memory. The processor executes a hash function to produce the manifest and to verify integrity of the plurality of software components by re-computing digests of the plurality of software components and comparing the computed digests with the digests of the manifest.

19 Claims, 4 Drawing Sheets

INTEGRITY SCANNER

BACKGROUND

1. Field

The present invention relates to the field of data security. More particularly, this invention relates to a platform and corresponding method for detecting changes in data stored within a platform.

2. General Background

Due to advances in signal processing technology and increased usage of the Internet, the distribution of digital information is increasing in popularity. In general, many computer users are now using the Internet to purchase and download software. Examples of this software include executable applications, JAVA™ scripts, software games, audio recordings, and the like. While the Internet provides a vehicle for users to knowingly download data, it also provides a vehicle for computer viruses or macro programs unknowingly downloaded to a user's computer.

It is well understood that a "computer virus" is software that is executed by a computer without the knowledge or authorization of the computer user. Upon execution, the virus software initiates an attack by making unauthorized and unwanted modifications to one or more components of the computer or to information stored on the computer. In particular, some computer viruses are capable of altering or destroying data stored on disk, scrambling characters or symbols on a monitor screen, displaying messages, and other damaging acts. Also, the computer virus may initiate an attack by attempting to propagate itself to other computers. This may be accomplished by making copies of itself on any accessible other non-volatile memory such as a diskette or hard disk.

To overcome the problems created by computer viruses, users have developed a variety of "anti-virus" programs that both detect and remove known computer viruses. Most anti-virus software programs search for certain characteristic behaviors of the known computer viruses. Once detected, the computer viruses are removed. Examples of commercially available anti-virus programs include VirusScan™ by McAfee Software, Inc. of Santa Clara, Calif.

While these anti-virus programs offer users some protection against computer viruses, they suffer from a number of disadvantages. For example, an anti-virus program is only effective against "known" computer viruses. Thus, the program is unable to detect and remove recently detected and unknown computer viruses. Another disadvantage is that intelligent computer viruses may be able to disguise their functionality or alter data to disguise their presence. Hence, it would be desirable to develop a method and platform for detecting changes in the integrity of data stored therein.

SUMMARY

Briefly, in one embodiment, the invention relates to a method comprising (i) producing and storing a manifest associated with a plurality of software components stored within a platform; and (ii) verifying the integrity of the plurality of software components in response to an event.

BRIEF DESCRIPTION OF THE DRAWINGS

The features and advantages of the present invention will become apparent from the following detailed description in which.

DETAILED DESCRIPTION

Figure 1:
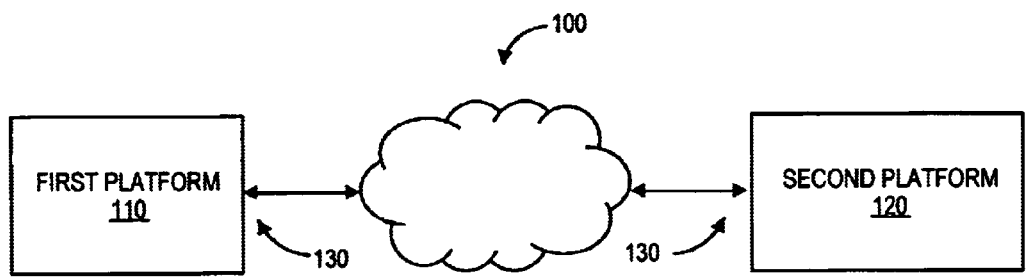
FIG. 1 is an illustrative block diagram of an embodiment of a network having a platform utilizing the present invention.

The present invention relates to a platform and corresponding method to detect changes in data stored within a platform in order to protect the integrity of the stored data from unauthorized substitution, addition or manipulation. In the following description, numerous specific details are set forth in order to provide a thorough understanding of the present invention. It will be obvious to one skilled in the art, however, that the present invention may be practiced without these specific details.

Herein, a number of terms and symbols are frequently used to describe certain characteristics of the present invention as well as its functionality. For example, a "platform" includes, but is not limited or restricted to a computer (e.g., a laptop, desktop, hand-held, server, mainframe, etc.), communication equipment (e.g., telephone, telephone with video display, etc.), a set-top box (e.g., cable box, network computer, etc.) or any other electronic device with data processing capability. A "communication link" is defined as a medium to transfer information from one location to another. Examples of a communication link include electrical wire, optical fiber, cable, wireless channel(s) established using infrared (IR) or radio frequency (RF) signaling, a private local area network, a wide area network or even the Internet.

"Information" is generally defined as (i) data in the form of programs, video, images, audio, text, or any combination thereof, and/or (ii) control such as Internet Protocol (IP) commands, identifiers and the like. This information resides in a digital format. A "data file" is information placed in any format readable or executable by a platform such as an executable (.exe) file, a text file inclusive of a uniform resource locator (URL) and the like.

When implemented in software, the elements of the present invention are generally code segments to perform one or more particular tasks. These code segments can be stored in a readable medium or transmitted by a computer data signal embodied in a modulated (carrier) wave or a digital data stream over a communication link. The "readable medium" may include any medium that can store or transfer information. Examples of the readable medium include an electronic circuit, a semiconductor memory device, a read only memory (ROM), a flash memory, an erasable ROM (EROM), a floppy diskette, a CD-ROM, an optical disk, a hard disk, a fiber optic medium, etc.

With respect to cryptographic functionality, a "key" is information used as a parameter by a cryptographic function to encrypt, decrypt and/or alter the format of digital information. Herein, each key is sized to be 160-bits in length, although any bit size may be used. A "manifest" is a selected list of digests (defined below) corresponding to selected applications, libraries, macros, etc. The manifest may be digitally signed to detect whether any contents of the manifest have been illicitly modified. A "digital signature" includes digital information signed with a private key of its signatory in accordance with a digital signature function. For clarity sake, one type of digital signature function described herein is a Digital Signature Algorithm (DSA) set forth in a 1998 publication entitled "Federal Information Processing Standards Publication 186-1" (Dec. 15, 1998). In this embodiment, the digital information may be provided in its entirety, in part, or after undergoing a one-way hash function.

A "one-way hash function" includes a function, mathematical or otherwise, that converts information from a variable-length to a fixed-length (referred to as a "digest"). The term "one-way" indicates that there does not readily exist an inverse function to recover any discernible portion of the original information from the fixed-length digest. Examples of a hash function include MD5 provided by RSA Data Security of Redwood City, Calif., or Secure Hash Algorithm (SHA-1) as specified a 1995 publication Secure Hash Standard FIPS 180-1 entitled "Federal Information Processing Standards Publication" (Apr. 17, 1995).

Referring to FIG. 1, an illustrative block diagram of an embodiment of a network 100 is shown. In this embodiment, network 100 comprises a first platform 110 and a second platform 120. As shown, platforms 110 and 120 are coupled together through a communication link 130 that enables information to be delivered from second platform 120 to first platform 110. This "information" includes one or more software components capable of running on first platform 110, each software component being any of the following: executable application, library, driver, configuration file, macro program, JAVA™ script, extension and the like.

Figure 2:
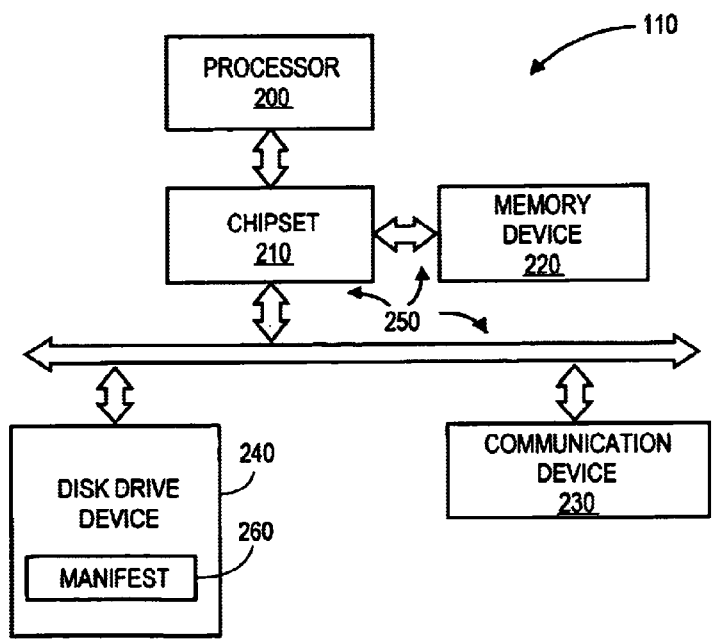
FIG. 2 is an illustrative block diagram of an embodiment of a platform utilizing the present invention.

As shown in FIG. 2, first platform 110 comprises a processor 200 (e.g., a microprocessor, a microcontroller, a state machine, etc.), a chipset 210, a memory device (e.g., main memory) 220, a communication device 230 (e.g., a modem card, network interface card, etc.) and a disk drive device 240 (e.g., a hard disk drive, an optical disk drive, a disk player to read and/or write a removable disk such as a compact disk, a digital video disk, a floppy diskette, etc.). These devices 200, 210, 220, 230 and 240 are coupled together through buses 250. As shown, disk drive device 240 includes software coded to produce a manifest 260 stored in either main memory 220 or disk drive device 240. It is contemplated, however, that hardware or firmware may be used to produce manifest 260 in lieu of software as shown.

Figure 3:
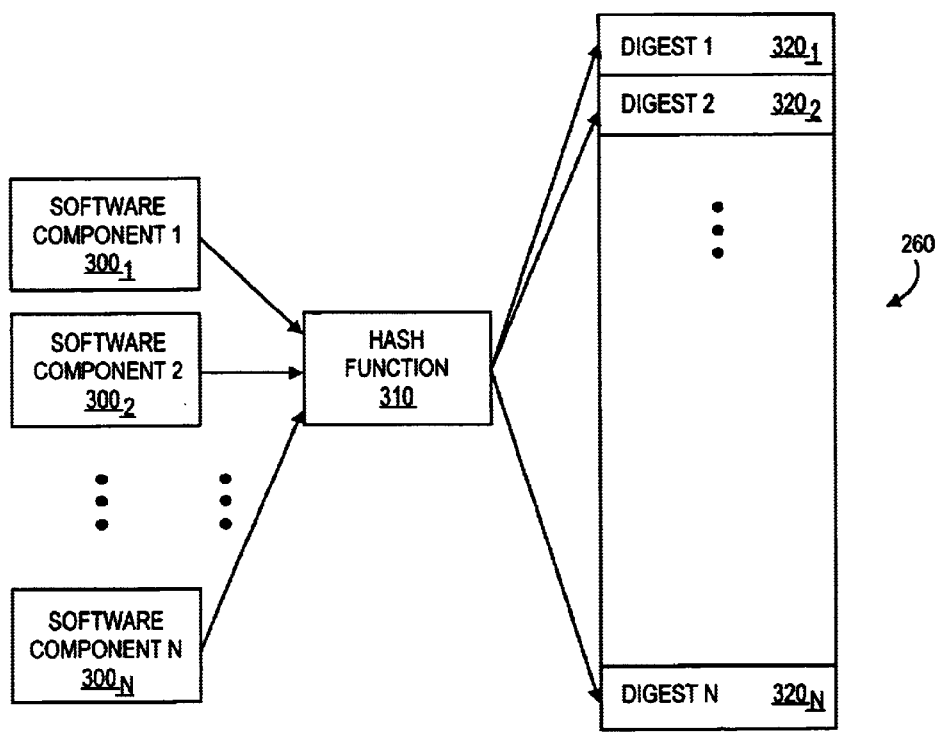
FIG. 3 is an illustrative block diagram of the operations performed by the platform of FIG. 2 to produce a manifest.

Referring now to FIG. 3, an illustrative block diagram of the operations performed by first platform 110 of FIG. 1 to produce manifest 260 is shown. In this embodiment, manifest 260 comprises a collection of digests. Each digest is data produced after a selected software component undergoes a one-way hash function. In particular, N software components $300_1$–$300_N$ are selected as part of manifest 260 (where "N" is a positive whole number). During initial configuration of manifest 260, each software components $300_1$–$300_N$ is either (i) separately input into a one-way hash function 310 in succession or after the function is reset as shown, or (ii) input in parallel into N one-way hash functions. After undergoing one-way hash function 310, digests $320_1$–$320_N$ associated with software components $300_1$–$300_N$ are produced. Each digest $320_1$–$320_N$ is a unique value represented by a predetermined number of bits. This collection of digests is digitally signed to produce a digital signature to accompany the manifest to protect data integrity.

Figure 4:
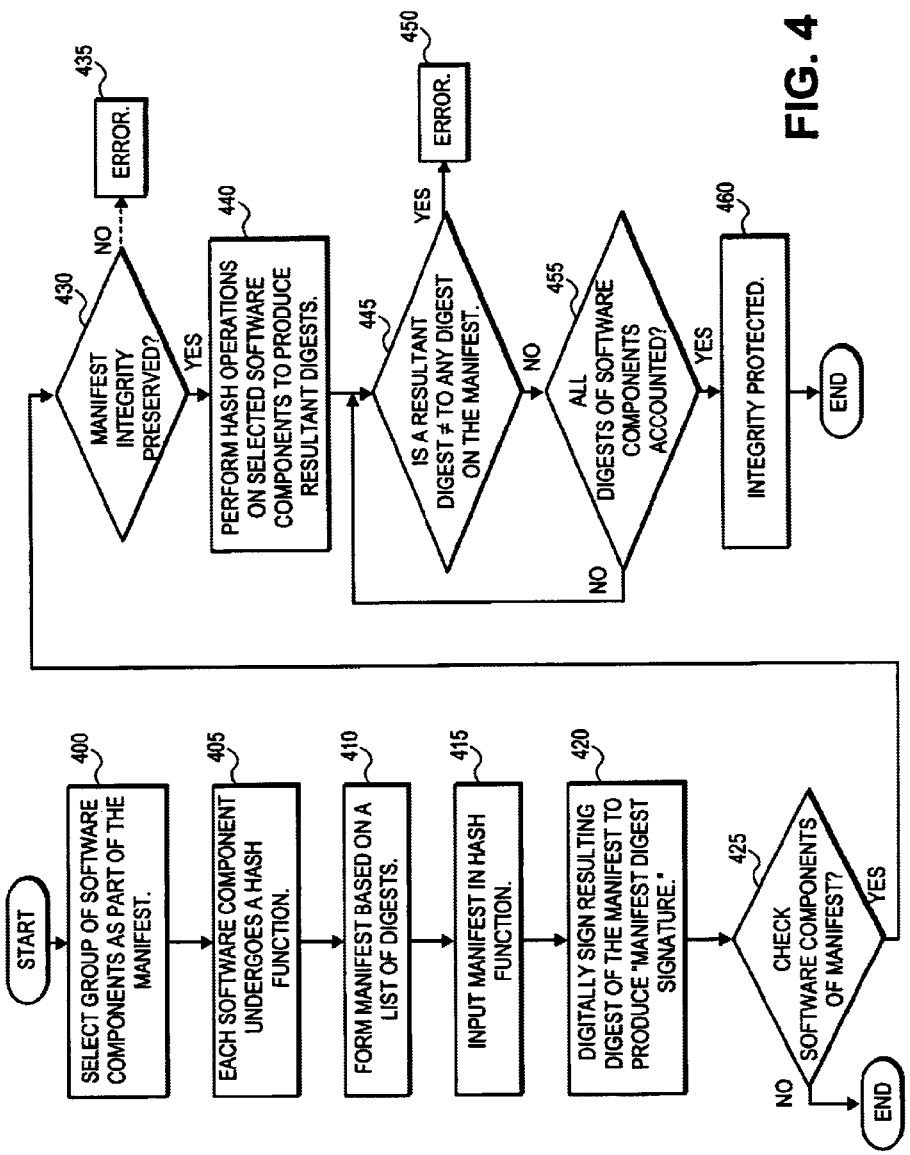
FIG. 4 is an illustrative flowchart of a protocol followed to protect the integrity of stored data within the platform of FIG. 2.

Referring now to FIG. 4, an embodiment of a protocol followed to protect the integrity of stored data within a platform is shown. Initially, a platform user selects a group of software components that are used to form the manifest (block 400). Namely, each of the selected software components undergo a one-way hash function to produce a corresponding digest. By forming a list of these digests, the manifest is created (blocks 405 and 410). In order to further protect the integrity of the stored data, it is contemplated that the manifest may be input into a one-way hash function to produce a resulting digest. That digest is signed to produce a digital signature of the manifest, which can be used to verify the integrity of the manifest itself (block 415 and 420).

Thereafter, during start-up of the operating system (OS) of the platform or when selected by the user when the OS is running, software components associated with the manifest are checked (block 425). The integrity of the manifest may be checked (block 430). This would be accomplished by performing a hash function on the manifest and comparing the digest recovered from the digital signature with the digest of the manifest. If a match is detected, the operation proceeds. Otherwise, an error condition is detected and the user is warned (block 435).

Then, the operation involves performing hash operations of selected software components and comparing the resultant digests to the contents of entries of the manifest (blocks 440 and 445). If no successful comparison is found after comparing a resultant digest with an entry of the manifest, the platform user (or a third party) is notified that a certain software component does not agree with the stored software components of the system (block 450). If a match is determined, the process is repeated for the each software component until all of the selected software components have been accounted for (blocks 455 and 460).

Figure 5:
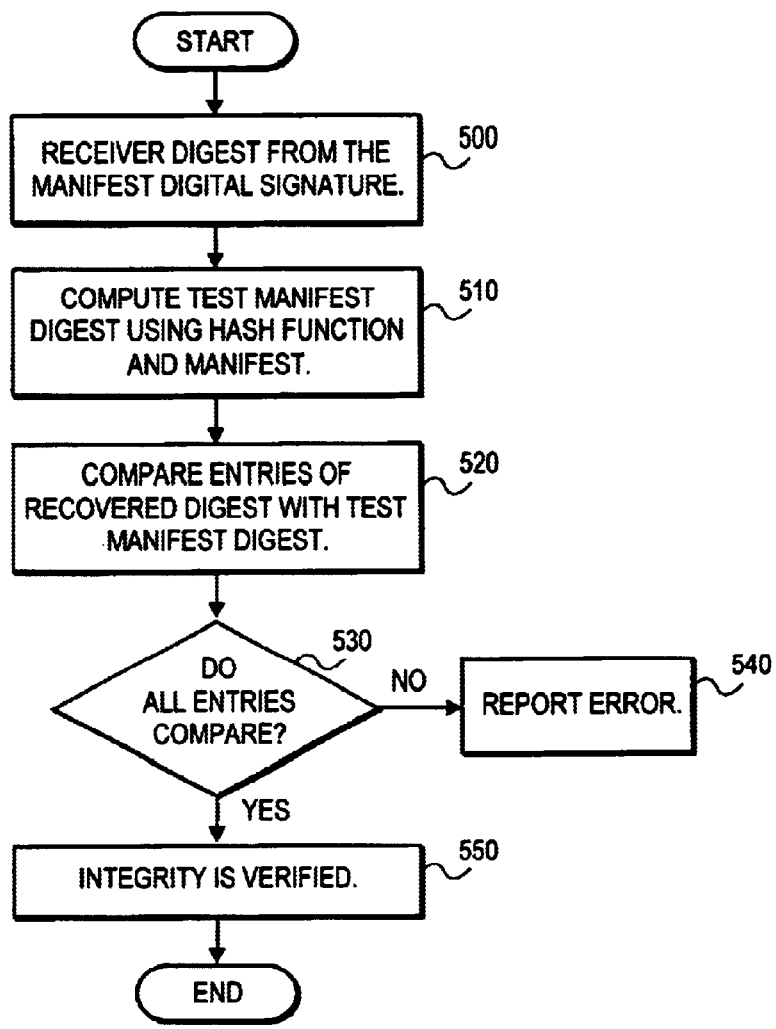
FIG. 5 is an illustrative flowchart of an embodiment for verifying the integrity of the manifest using signature comparison operations.

In particular, as shown in FIG. 5, verification of the integrity of the manifest involves a signature comparison operation. First, from the manifest digital signature, a digest is recovered using a key of the signatory (block 500). This signatory key may be publicly available or stored within the first platform prior to the operation. The manifest is then processed through a one-way hash function, identical to the hash function used to originally produce a digest of the digital signature, to compute a test manifest digest (block 510). The test manifest digest is compared with recovered digest (block 520). If a match is detected, an error is reported (blocks 530 and 540). However, if a match is not detected, a follow-up operation is performed for the next digest recovered from the manifest until all digests of the selected software components have been accounted for and verified (block 550). Thus, the integrity of the manifest has been verified.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. An apparatus comprising:
   a memory to contain a plurality of software components and a manifest including a digest of each of the plurality of the software components; and
   a processor coupled to the memory, the processor to execute a separate hash function on each of the plurality of software components to produce each digest included in the manifest, and to verify integrity of the plurality of software components by re-computing digests of the plurality of software components and comparing the computed digests with the digests of the manifest.

2. The apparatus of claim 1, wherein one of the plurality of software components includes an executable application.

3. The apparatus of claim 1, wherein one of the plurality of software components includes a library.

4. The apparatus of claim 1, wherein one of the plurality of software components includes a macro program.

5. The apparatus of claim 1, wherein one of the plurality of software components includes a JAVA™ script.

6. The apparatus of claim 1, wherein the memory further contains the hash function.

7. The apparatus of claim 1, wherein the processor further digitally signs the manifest to produce a manifest digital signature.

8. The apparatus of claim 1, wherein the processor further recovers a first digest of the manifest from the manifest digital signature, computes a second digest by running the manifest through the hash function and compares the first digest with the second digest.

9. A method comprising:

producing a manifest associated with a plurality of stored software components by executing a separate hash function on each of the plurality of stored software components;

storing the manifest; and verifying the integrity of the plurality of software components in response to an event.

10. The method of claim 9, wherein the verifying of the integrity includes determining whether a computer virus is associated with any of the plurality of software components.

11. The method of claim 9, wherein the plurality of software components include stored executable applications.

12. The method of claim 11, wherein the verifying includes determining whether an executable application, other than the executable applications of the plurality of software components, is now stored.

13. The method of claim 9, wherein the verifying includes computing a digest for each of the plurality of software components; and comparing the computed digests with digests associated with the manifest.

14. The method of claim 13, wherein the verifying further includes determining whether the computed digests matches one of the digests associated with the manifest;

continuing to compare another computed digest to each of the digests associated with the manifest if a match is detected between the computed digest and one of the digests; and returning an error if the computed digest fails to match any of the digests associated with the manifest.

15. The method of claim 14, wherein prior to verifying of the integrity of the plurality of software components, the method further comprises:

producing a manifest digital signature associated with the manifest; and using the manifest digital signature to verify the integrity of the manifest.

16. The method of claim 15, wherein the using of the manifest digital signature includes recovering a digest of the manifest from the manifest digital signature;

performing a hash function on the manifest to produce a manifest digest; and comparing the recovered digest with the manifest digest.

17. An article comprising:

a computer readable medium having instructions thereon which when executed cause a computer to:

produce a manifest associated with a plurality of software components stored within the platform by executing a separate hash function on each of the plurality of software components;

store the manifest; and verify the integrity of the plurality of software components in response to an event.

18. The article of claim 17, the computer readable medium further having instructions thereon which when executed further cause a computer to perform the following functions in order to verify the integrity of the plurality of software components:

compute a digest for each of the plurality of software components; and compare the computed digests with digests associated with the manifest.

19. The article of claim 18, the computer readable medium further having instructions thereon which when executed further cause a computer to perform the following functions in order to verify the integrity of the plurality of software components:

determine whether the computed digests matches one of the digests associated with the manifest;

continue to compare another computed digest to each of the digests associated with the manifest if a match is detected between the computed digest and one of the digests; and return an error if the computed digest fails to match any of the digests associated with the manifest.

* * * * *